(12) United States Patent
Di Florio et al.

(10) Patent No.: US 8,386,348 B2
(45) Date of Patent: Feb. 26, 2013

(54) SYSTEM AND METHOD FOR COMPARING AND ANALYZING EXPENDITURES AND SAVINGS OVER DIFFERENT TIME PERIODS

(75) Inventors: Dionino Di Florio, London (GB); Olivier Sauser, Jouars Ponchartrain (FR)

(73) Assignee: American Express Travel Related Services Company, Inc., New York, NY (US)

( * ) Notice: Subject to any disclaimer, the term of this patent is extended or adjusted under 35 U.S.C. 154(b) by 1070 days.

(21) Appl. No.: 11/290,562

(22) Filed: Dec. 1, 2005

(65) Prior Publication Data
US 2007/0203814 A1    Aug. 30, 2007

Related U.S. Application Data

(60) Provisional application No. 60/712,428, filed on Aug. 31, 2005.

(51) Int. Cl.
*G06Q 40/00* (2012.01)
(52) U.S. Cl. .......................................................... 705/35
(58) Field of Classification Search ............... 705/35–44
See application file for complete search history.

(56) References Cited

U.S. PATENT DOCUMENTS 7,529,688 B2 * 5/2009 Prakash ............................ 705/26
2004/0034584 A1 * 2/2004 Cory et al. ....................... 705/35

OTHER PUBLICATIONS

Captura Software Inc. http://sec.edgar-online.com/2000/10/12/15/0001032210-00-002037/Section11.asp Oct. 12, 2000.*
Roberta Duffy "Measuring Up" Inside Supply Management, May 2005, vol. 16, No. 5, p. 22.*

* cited by examiner

*Primary Examiner* — Thomas M Hammond, III
(74) *Attorney, Agent, or Firm* — Snell & Wilmer L.L.P.

(57) ABSTRACT

A method of comparing and analyzing expenditures and savings for a first and a second time period includes a first step of receiving consumption data, expenditure data and market price data for the first and second time periods, a second step of calculating data representing a change in savings from the first time period to the second time period, based on differences between the market price data and the expenditure data for the two time periods, and a third step of outputting the data representing the change in savings from the first to the second time period. The consumption data represents a type and an amount of a commodity consumed during a given time period, the expenditure data represents an actual cost paid for the commodity consumed during that given time period, and the market price data represents a market price of the commodity consumed during that given time period.

18 Claims, 13 Drawing Sheets

Savings Variation Matrix

Savings Variation Matrix – 2004Q1 vs 2003Q1

Air Carrier Selection: all
Class of Service Selection: all

Global Market Spend T1: 432,473
Global Actual Spend T1: 323,056
Savings Margin %: 25.30%

| Key Metrics | Period 1 | Dropped Spend | Consumption Effect | Price Effect | Exchange Rate Effect | New Spend | Total Variation | Period 2 |
|---|---|---|---|---|---|---|---|---|
| Sectors | 2,114 | -20 | -89 | 0 | 0 | 116 | 7 | 2,121 |
| Market Spend | 432,473 | -4,843 | 18,099 | -6,115 | 67,929 | 21,810 | 96,880 | 529,353 |
| Actual Spend | 323,056 | -3,150 | 4,045 | -4,847 | 49,288 | 20,442 | 65,779 | 388,835 |
| Savings Margin | 109,416 | -1,693 | 14,054 | -1,269 | 18,640 | 1,368 | 31,101 | 140,517 |
| Savings Margin % | 25.30% | | | | | | | 26.55% |
| Market Spend % | | -1.12% | 4.18% | -1.41% | 15.71% | 5.04% | 22.40% | |
| Actual Spend % | | -0.97% | 1.25% | -1.50% | 15.26% | 6.33% | 20.36% | |
| Savings Variance % | | -0.14% | 2.93% | 0.09% | 0.45% | -1.28% | 2.04% | 1.24% |
| Savings Variance | | -468 | 9475 | 279 | 1454 | -4150 | 6590 | |
| Average Sector Spend | 152.82 | | | | | | | 183.33 |
| Average Market Spend | 204.58 | | | | | | | 249.58 |
| Average Savings per Sector | 51.76 | | | | | | | 66.25 |

Table 1: air sector variables

| Variable | Description | Type |
|---|---|---|
| Quarter | Period 1 and 2 expressed as a quarter date | Class |
| Parent | Major corporate code | Class |
| Country | Country of ticketing | Class |
| TckCur | Ticket Currency | Class |
| AirPair | Airport pair | Class |
| ClsServ | Class of service | Class |
| AirCarrier | Air Carrier | Class |
| Sectors | Number of sectors | KVI |
| ASF | Actual paid fare (average price) | KVI |
| PSF | Published fare (average) | KVI |
| Savings | PSF-ASF | KVI |
| ExcRate | Average Exchange Rate (weighted with price) | KVI |

Table 2: air sector groups

| Group | Description |
|---|---|
| New routes | The corporate are using routes at time 2 that it didn't used at time 1 |
| Old routes | The corporate are using routes at time 2 that it already used at time 1 |
| Dead routes | The corporate no more uses routes at time 2 that it already used at time 1 |

Table 3: air sector variance indicators

| Variable | Description | Formula | Type |
|---|---|---|---|
| Sectors1 | Number of sectors at time 1 | Basic aggregation | KVI |
| ASF1 | Actual paid fare (average price) at time 1 | Basic aggregation | KVI |
| PSF1 | Published fare (average) at time 1 | Basic aggregation | KVI |
| ExcRate1 | Average Exchange Rate (weighted with price) at time 1 | Basic aggregation | KVI |
| Spend1 | Spend at time 1 | = ASF1*Sectors1 | derived KVI |
| Savings1 | Savings at time 1 | = (PSF1-ASF1)*Sectors1 | derived KVI |
| Sectors2 | Number of sectors at time 2 | Basic aggregation | KVI |
| ASF2 | Actual paid fare (average price) at time 2 | Basic aggregation | KVI |
| PSF2 | Published fare (average) at time 2 | Basic aggregation | KVI |
| ExcRate2 | Average Exchange Rate (weighted with price) at time 2 | Basic aggregation | KVI |
| Spend2 | Spend at time 2 | = ASF2*Sectors2 | derived KVI |
| Savings2 | Savings at time 2 | = (PSF2-ASF2)*Sectors2 | derived KVI |
| D_Sectors | Delta Sectors | = Sectors2-Sectors1 | derived KVI |
| D_ASF | Delta Actual fare | = ASF2-ASF1 | derived KVI |
| D_PSF | Delta Published fare | = PSF2-PSF1 | derived KVI |
| D_ExcRate | Delta Exchange Rate | = ExcRate2-ExcRate1 | derived KVI |
| D_Spend | Delta Spend | = Spend2-Spend1 | derived KVI |
| D_Savings | Delta Savings | = Savingd2-Savings1 | derived KVI |

FIG. 1

Table 4: air sector variation components in the current currency

| Group | Effect | Description | Formula |
|---|---|---|---|
| New routes | NewSpend_e | Effect associated to the new routes | =Sectors2*ASF2 |
| Old routes | OldSpend_e | Effect associated to the variation of average fares. | =Sectors2*ASF2-Sectors1*ASF1 |
| Old routes | Price_e | Effect on the spend dued to the variation of public prices. | =Sectors2*ASF2 *D_PSF/PSF1 |
| Old routes | Amex_e | Effect associated to the Amex contribution on Cost Management | =OldSpend_e-Price_e |
| Old routes | Sector_e | Effect associated to the variation of sectors bought by the Client. | =ASF1*D_Sectors |
| Dead routes | DeadSpend_e | Effect associated to routes no more used | =- (ASF1*Sectors1) or =ASF1*D_Sectors |

Note: OldSpend_e=Amex_e+Price_e

Table 5: air sector spend variation components in USD

| KVI | Description | Formula |
|---|---|---|
| Spend1 | Spend at time 1 | =Sectors1*ASF1*ExcRate1 |
| NewSpend_e | Spend effect associated to the new routes | =Sectors2*ASF2*ExcRate1 |
| OldSpend_e | Spend effect associated to the variation of average fares. | =(Sectors2*ASF2-Sectors1*ASF1)*ExcRate1 |
| Price_e | Spend effect on the spend due to the variation of prices. | =Sectors2*D_ASF*ExcRate1 |
| PubPrice_e | Spend effect on the spend due to the variation of public prices (pub fares). | =Sectors2*ASF2 *D_PSF/PSF1*ExcRate1 |
| Amex_e | Spend effect associated to the Amex contribution on Cost Management | =Price_e-PubPrice_e*ExcRate1 |
| Sector_e | Spend effect associated to the variation of sectors bought by the Client. | =ASF1*D_Sectors*ExcRate1 |
| DeadSpend_e | Spend effect associated to routes no more used | =- (ASF1*Sectors1) *ExcRate1 or =ASF1*D_Sectors*ExcRate1 |
| ExcRate_e | Effect associated to exchange Rates variations | =(NewSpend_e+Amex_e+Price_e+ Sector_e+DeadSpend_e)*D_ExcRate |
| Spend2 | Spend at time 2 | =Sectors2*ASF2*ExcRate2 |
| D_Spend | Delta Spend | =Spend2-Spend1 |

Note: OldSpend_e=Price_e+Sector_e and Price_e=PubPrice_e+Amex_e

FIG. 2

Table 6: air sector savings variation components in USD

| KVI | Description | Formula |
|---|---|---|
| Savings1 | Savings at time 1 | =Sectors1*(PSF1-ASF1)*ExcRate1 |
| NewSavings_e | Savings effect associated to the new routes | =Sectors2*(PSF2-ASF2)*ExcRate1 |
| OldSavings_e | Savings effect associated to the variation of average fares respect to published fares. | =(Sectors2*(PSF2-ASF2)- Sectors1*(PSF1-ASF1))*ExcRate1 |
| SvPrice_e | Savings effect on the spend due to the variation of prices. | =Sectors2**((PSF2-ASF2)-(PSF1-ASF1))*ExcRate1 |
| PubPrice_e | Savings effect on the spend due to the variation of public prices (pub fares). | =Sectors2*ASF2 *D_PSF/PSF1*ExcRate1 |
| SvAmex_e | Savings effect associated to the Amex contribution on Cost Management | =SvPrice_e-PubPrice_e*ExcRate1 |
| SvSector_e | Savings effect associated to the variation of sectors bought by the Client. | =(PSF1-ASF1)*D_Sectors*ExcRate1 |
| DeadSavings_e | Savings effect associated to routes no more used | =- (PSF1-ASF1)*Sectors1*ExcRate1 |
| SavExcRate_e | Savings effect associated to exchange Rates variations | =(NewSavings_e+Amex_e+Price_e+Sector_e+DeadSpend_e)*D_ExcRate |
| Savings2 | Savings at time 2 | =Sectors2*(PSF2-ASF2)*ExcRate2 |
| D_Savings | Delta Savings | =Savings2-Savings1 |

Note: OldSavings_e=SvPrice_e+SvSector_e and SvPrice_e=PubPrice_e+SvAmex_e

FIG. 3

$$\text{Contribution of Effect} = \left(\frac{MS_2 - MS_1}{MS_1} - \frac{AS_2 - AS_1}{AS_1}\right) * AS_1 = AS_1 * \frac{MS_2 - MS_1}{MS_1} - AS_2 + AS_1$$

$$\text{Contribution of Effect} = \frac{AS_1 MS_2 - AS_1 MS_1}{MS_1} - AS_2 + AS_1$$

$$\text{Contribution of Effect} = \frac{AS_1 MS_2}{MS_1} - \frac{AS_1 MS_1}{MS_1} - \frac{AS_2 MS_1}{MS_1} + \frac{AS_1 MS_1}{MS_1}$$

$$\text{Contribution of Effect} = \frac{AS_1 MS_2}{MS_1} - AS_2 = \frac{AS_1 MS_2}{MS_1} - AS_2 + MS_2 - MS_2$$

$$\left(\frac{MS_1 - AS_1}{MS_1}\right) = \left(\frac{MS_2 - (AS_2 + \text{Contribution of Effect})}{MS_2}\right)$$

$$\text{Contribution of Effect} = MS_2 \left(\frac{MS_2 - AS_2}{MS_2}\right) - MS_2 \left(\frac{MS_1 - AS_1}{MS_1}\right)$$

$$\frac{\text{Contribution of Effect}}{MS_2} = \left(\frac{MS_2 - AS_2}{MS_2}\right) - \left(\frac{MS_1 - AS_1}{MS_1}\right)$$

Recall that $\text{Savings Variance \%} = \left(\frac{MS_2 - AS_2}{MS_2}\right) - \left(\frac{MS_1 - AS_1}{MS_1}\right)$ $$\text{Savings Variance \%} = \left(\frac{MS_2 - AS_2}{MS_2}\right) - \left(\frac{MS_2 - (AS_2 + \text{Contribution of Effect})}{MS_2}\right) = \frac{\text{Contribution of Effect}}{MS_2}$$

or we can write:

$$\text{Savings Variance \%} = \frac{\text{Dropped Spend Effect}}{MS_2} + \frac{\text{Consumption Effect}}{MS_2} + \frac{\text{Price Effect}}{MS_2} + \frac{\text{Exchange Rate Effect}}{MS_2} + \frac{\text{New Spend Effect}}{MS_2}$$

FIG. 4

| Rank | Airport Pair | Avg Spend | # of Sectors 1st Per. | # of Sectors 2nd Per. | Cumulate % of Total Spend | Savings Variance % | Savings Variance | Route Type |
|---|---|---|---|---|---|---|---|---|
| 1 | BRU EWR | 650,440 | 494 | 593 | 3.33% | -2.35% | -27,860 | Active |
| 2 | EWR LHR | 434,474 | 289 | 248 | 5.56% | 7.25% | 63,928 | Active |
| 3 | BRU ZRH | 356,700 | 1,226.00 | 1,301.00 | 7.38% | 31.46% | 138,282 | Active |
| 4 | AMS EWR | 309,971 | 335 | 114 | 8.97% | -3.13% | -7,866 | Active |
| 5 | AMS PHL | 229,342 | 239 | 224 | 10.14% | -45.67% | -119,522 | Active |
| 6 | AMS FCO | 201,363 | 1,124.00 | 84 | 11.18% | -3.42% | -1,172 | Active |
| 7 | AMS MIA | 177,166 | 122 | 140 | 12.08% | 8.42% | 37,969 | Active |
| 8 | BRU LHR | 172,947 | 1,083.00 | 1,467.00 | 12.97% | -6.17% | -17,623 | Active |
| 9 | FCO LIN | 154,696 | 736 | 924 | 13.76% | -17.88% | -37,968 | Active |
| 10 | CDG LHR | 151,399 | 717 | 733 | 14.54% | -3.70% | -6,927 | Active |
| 11 | LHR ZRH | 142,434 | 553 | 579 | 15.27% | 1.85% | 3,778 | Active |
| 12 | HAM LHR | 138,324 | 353 | 611 | 15.97% | -1.98% | -4,259 | Active |
| 13 | FCO LHR | 135,828 | 424 | 388 | 16.67% | -4.26% | -6,749 | Active |

Rank     Ranked by average spend
Airport Pair     Route Indicated by Airport pair with no directional airport sequence
Avg Spend     Average spend between period 1 & period 2 weighted by number of sectors
# of Sectors 1st Per.     Actual sectors in period 1
# of Sectors 2nd Per.     Actual sectors in period 2
Cumulate % of Total Spend     Accumulation Percentage of total spend
Savings Variance %     Percentage difference between savings margin in period 1 and savings margin in period 2
Savings Variance     Monetary difference between savings margin in period 1 and savings margin in period 2
Route Type     Active route appears in period 1 and 2, New route only appears in period 2 and Inactive route only appears in period 1

FIG. 7

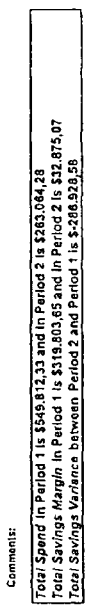
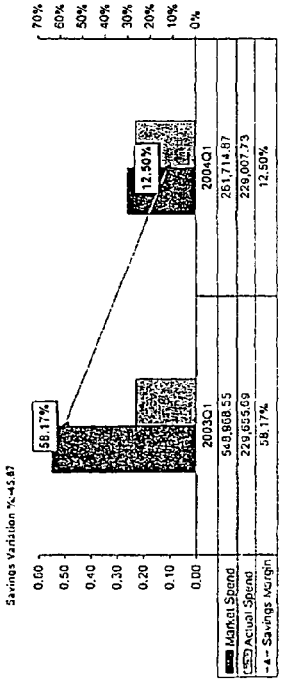
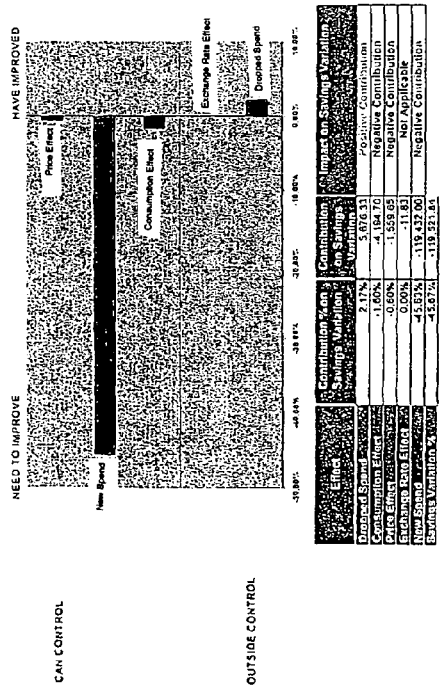
FIGURE 8

Savings Tracker Outputs – Supply and demand analysis

Drivers Analysis
Per route/city

Demand – Supply Analysis – 2003Q4 vs 2004Q4

| | 2003Q4 | 2004Q4 | Variation |
|---|---|---|---|
| Total Demand # of Sectors | 25.317,00 | 23.633,00 | -7,13% |
| Total Supply # of Seats | 114.594,00 | 122.140,00 | 6,18% |
| Ratio Demand/Supply | 22,09% | 19,35% | -14,18% |
| Total Supply # of Carriers | 2 | 2 | 0,00% |
| Total Supply # of Flights | 1.078 | 1.086 | 0,74% |

*Analysis on the supply and demand trends per route or city*

Comments:
Supply went up and Demand went down
The pressure on the market decreased

FIG. 11

Savings Variation Matrix

Savings Variation Matrix – 2004Q1 vs 2003Q1

Air Carrier Selection: all

Class of Service Selection: all

| | | Global Market Spend T1 | 432,473 |
| | | Global Actual Spend T1 | 323,056 |
| | | Savings Margin % | 25.30% |

| Key Metrics | Period 1 | Dropped Spend | Consumption Effect | Price Effect | Exchange Rate Effect | New Spend | Total Variation | Period 2 |
|---|---|---|---|---|---|---|---|---|
| Sectors | 2,114 | -20 | -89 | 0 | 0 | 116 | 7 | 2,121 |
| Market Spend | 432,473 | -4,843 | 18,099 | -6,115 | 67,929 | 21,810 | 96,880 | 529,353 |
| Actual Spend | 323,056 | -3,150 | 4,045 | -4,847 | 49,288 | 20,442 | 65,779 | 388,835 |
| Savings Margin | 109,416 | -1,693 | 14,054 | -1,269 | 18,640 | 1,368 | 31,101 | 140,517 |
| Savings Margin % | 25.30% | | | | | | | 26.55% |
| Market Spend % | | -1.12% | 4.18% | -1.41% | 15.71% | 5.04% | 22.40% | |
| Actual Spend % | | -0.97% | 1.25% | -1.50% | 15.26% | 6.33% | 20.36% | |
| Savings Variance % | | -0.14% | 2.93% | 0.09% | 0.45% | -1.28% | 2.04% | 1.24% |
| Savings Variance | | -468 | 9475 | 279 | 1454 | -4150 | 6590 | |
| Average Sector Spend | 152.82 | | | | | | | 183.33 |
| Average Market Spend | 204.58 | | | | | | | 249.58 |
| Average Savings per Sector | 51.76 | | | | | | | 66.25 |

FIGURE 12

SYSTEM AND METHOD FOR COMPARING AND ANALYZING EXPENDITURES AND SAVINGS OVER DIFFERENT TIME PERIODS

CROSS REFERENCE TO RELATED APPLICATIONS

This application claims priority to, and the benefit of, U.S. Provisional Patent Application Ser. No. 60/712,428, filed Aug. 31, 2005, which is hereby incorporated by reference in its entirety.

BACKGROUND OF THE INVENTION

1. Field of the Invention

The present invention generally relates to systems and methods for comparing and analyzing expenditures and savings over different time periods, and in particular to such systems and methods for comparing and analyzing expenditures and savings for travel-related commodities, such as air travel and hotel accommodation.

2. Related Art

Currently, an organization may spend significant amounts of money on travel-related expenses for its employees, such as air travel and hotel accommodation. Budgetary pressures often require keeping such expenses to a minimum. Accordingly, there is a need to measure and analyze spending and savings so as to identify and quantify factors contributory and detrimental to savings. Armed with knowledge of such factors, an organization may effectively modify its (employees') behavior in terms of spending and consumption so as to improve overall cost performance.

The attempt to minimize expenditures laid out for any given commodity is complicated by the fact that prices and other factors influencing savings (e.g., consumption patterns, exchange rates) often change over time. Accordingly, behavior modification based on an analysis of expenditures and savings pertaining to a single point in time or time period may cease to be effective as the factors influencing savings change over time. Thus, measurement and analysis of spending and savings based on a static methodology tend to be inadequate to achieve optimal savings.

In addition to the problem of developing a dynamic savings methodology, attempts at increasing savings often encounter difficulties in, for example, the following aspects of a savings program: accurately identifying and quantifying the particular factors that are contributing to savings and those that are detracting from savings; providing information about such factors at different levels of detail (e.g., overall corporate consumption vs. consumption of a particular type of commodity); providing recommendations for action (behavior modification) based on the analysis of spending and savings, in a user-friendly format, thereby increasing the likelihood that such recommendations will be acted upon; providing written reports on the analysis and recommendations in an automated and prompt fashion; and comparing the organization's savings performance to that of peers.

SUMMARY OF THE INVENTION

The present invention provides a system, method and computer program product for analyzing and comparing expenditures and savings over different time periods that meets the above-identified needs.

An advantage of the system is that it provides metrics for measuring, comparing and analyzing spending and savings at different time periods. It identifies and quantifies different factors that influence savings, showing the effects caused by such factors across different time periods. Based on the knowledge of the factors driving savings, or the components of savings, and the magnitudes of their respective effects over different time periods, recommendations for action (behavior modification) to increase savings can be provided. The system can also be updated as needed to take into account factors newly identified as influencing savings.

Another advantage of the system is that it produces spending and savings data at different levels of analysis, e.g., at the level of overall consumption of an organization, or at the level of consumption of a particular type of commodity (good or service). At the commodity level, again different levels of analysis are provided. The definition of the commodity can be broadened or narrowed in order to determine spending and savings data for the commodity at different levels of specificity of the commodity. For example, the commodity could be conceived of as an air ticket for a certain route (broader) or as an air ticket for a certain route on a certain air carrier at a certain class of service (narrower).

Another advantage of the system is that it provides analyses consistent with standard accounting principles. The system provides metrics for measuring spending and savings and performs analyses thereof in terms of both a balance sheet (measurement of spending or savings in a given time period) and a profit and loss (P & L) account (measurement of the variation of spending or savings between two periods of time).

Another advantage of the system is that it can compare the spending and savings performance of a given organization (client) with peer organizations.

Another advantage of the system is that it can perform economic analysis of the market for a commodity, independent of the analysis of spending and savings.

The results of the comparative peer-client analysis and of the economic analysis can be used to provide further insight into client performance and supplement or refine recommendations for action implicated by the results of the spending and savings analysis.

Another advantage of the system is that it can provide reports, including analyses of spending and savings and recommendations for improving performance, in an automated and prompt fashion, based on large amounts of data. On-line real time processing of the aggregated data at any level may be performed. The reports show the results in user-friendly, e.g., graphical and tabular, formats for ease of understanding.

Another advantage of the system is that it provides for automatic input of data for an organization whose spending and savings are to be analyzed. For example, the data required from the organization may be automatically electronically transferred to a storage medium for ultimate use by the system, upon each credit card purchase of the commodity with respect to which savings is being analyzed. The transferred data is modified and enriched as necessary for use by the system.

The system may receive as inputs the following data: consumption data, expenditure data, market price data, and exchange rate data. As noted, the system may be updated to employ additional data representing factors newly identified as influencing savings.

Consumption data represents a type and an amount of a commodity purchased. If the commodity is air travel, the amount may be represented as the number of sectors, i.e. the number of one-way trips between two geographical points. The type may refer to any or all of a variety of identifying features of a one-way air trip, e.g., airport pair, air carrier, class of service (e.g., first class, economy class, etc.), date of ticket purchase, etc. Some of the identifying features will be necessary for basic operations of the system (e.g., date of purchase is necessary to determine in which of the two time periods the purchase occurred), while others permit a more thorough and detailed analysis but could optionally be omitted.

If the commodity is hotel accommodation, the amount may be represented by the number of nights of accommodation, and the type may refer to identifying features such as the location (city) of the hotel, the particular hotel chain, the class of the room, date of purchase, etc. For other commodities, the amount and type would be represented by analogous features, as appropriate.

Expenditure data represents the actual amount of money paid for the commodity purchased.

Market price data represents a market price of the commodity purchased. If the commodity is air travel, a published airfare may be used as the market price.

Exchange rate data represents the exchange rate in effect at the time of purchase of the commodity.

The system uses the expenditure data and the market price data to calculate spending data and savings data for each of the two time periods. Savings may be defined as the difference between market price and actual price. The system calculates data representing a change in savings from the first time period to the second time period based on the differences between the market price data and the expenditure data for the two time periods.

For example, the system compares the expenditure data for the first time period to the market price data for the first time period, and compares the expenditure data for the second time period to the market price data for the second time period, and calculates savings data for each of the two time periods. For each period of time, the savings may be calculated as the difference between the market price of a commodity and the actual price paid for the commodity. (The system may also calculate the change in spending over the two time periods.) The savings data for the two time periods are compared. The variation between the savings achieved during the first time period and the savings achieved during the second time period is output, in percentage terms. The savings variation percentage may be converted to absolute (e.g., U.S. dollar) terms. (In that case, of course, if the data includes expenditures or market prices recorded in different currencies, conversion into a single currency, taking into account fluctuations between the currencies involved during the relevant time period, must be performed.)

Alternative methods of calculating the savings variation are possible. For example, the system may compare the market price data for the second period with the market price data for the first period, and the expenditure data for the second period with the expenditure data for the first period. The change in savings over the two time periods may be calculated as the difference between the change in market price and the change in expenditure (actual price).

The system also compares the exchange rate data for the two time periods, and takes this data into account in obtaining the results.

In addition to outputting the results discussed so far, the system also provides as outputs values of different components of savings, i.e., different factors that drive (have an effect on) savings. These components include a consumption effect, an expenditure effect, a market price effect, an exchange rate effect, and effects of changes, over the two time periods, in patterns of consumption. For example, the consumption effect represents the effect on savings of a change, over the two time periods, in the amount of consumption of a (type of a) commodity (e.g., a change in the number of sectors purchased for a given airport pair on a given air carrier at a given class of service). The expenditure effect represents the effect on savings of a change, over the two time periods, in the actual price paid for the commodity. The market price effect represents the effect on savings of a change, over the two time periods, in the market price of the commodity. The exchange rate effect represents the effect on savings of a change, over the two time periods, in the exchange rate in effect at the time of purchase of the commodity. The effect of a changed pattern of consumption represents the effect on savings of the cessation or commencement of consumption of the commodity. This refers to a situation in which the commodity is purchased in only one of the two time periods. Purchasing of the commodity effectively ceases or commences between the two time periods.

The value of a given component of savings output by the system shows the magnitude of the effect on savings of that component, i.e., the amount of that component's contribution to the change in savings between the first time period and the second time period. Based on the knowledge of the respective magnitudes of the effects of the different factors that drive savings, or components of savings, recommendations for modifying consumption and spending behavior can be made to improve savings. These recommendations may take into account the results of analysis of the spending and savings performance of peer organizations and the results of independent economic analysis of the market for the commodity.

The analyses of spending, savings and savings components can be performed at different levels of detail, using, for example, a 'drill down' or 'slice and dice' technique. For example, analyses can be performed at the level of the overall picture (total spending of an organizational entity) to increasingly smaller subsets (or increasingly narrower types) of commodities purchased. Analyses can also be performed showing different, cross-cutting categories of purchases, e.g., air travel for a given airport pair, air travel on a given carrier, air travel for a given class of service, air travel for a given airport pair on a given carrier for a given class of service, etc.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings.

FIGS. 1-3 illustrate Tables 1-6, which show examples of variables, definitions and formulae used by the invention, as input data, derived data or output data.

FIG. 4 illustrates a mathematical derivation of savings variance (percentage) as a sum of components thereof, as an example of mathematical expression for a component of a change in savings from a first to a second time period.

FIG. 7 shows a sample output consisting of a portion of a table of non-directional air routes ranked by total average spending in the two time periods, the air routes representing total (global) spending.

FIG. 8 shows a sample output showing, at the level of an individual air route, results of analysis of the same type as shown in FIGS. 5 and 6.

FIG. 9 shows the different air carrier+class of service combinations (and the magnitudes of their respective effects) responsible for the single largest component of the change in savings from the first to the second time period, for the individual air route the results of which are presented in FIG. 8. Thus, FIG. 9 shows the commodity subcomponents of the single largest component of the change in savings shown in FIG. 8.

FIG. 11 shows a sample output showing, at a global level, an independent economic analysis of the market for air sectors for the two time periods.

FIG. 12 shows a sample output showing global results of the type shown in FIGS. 5 and 6, but using an alternative example of the savings variance percentage.

DETAILED DESCRIPTION OF THE INVENTION

Figure 5:
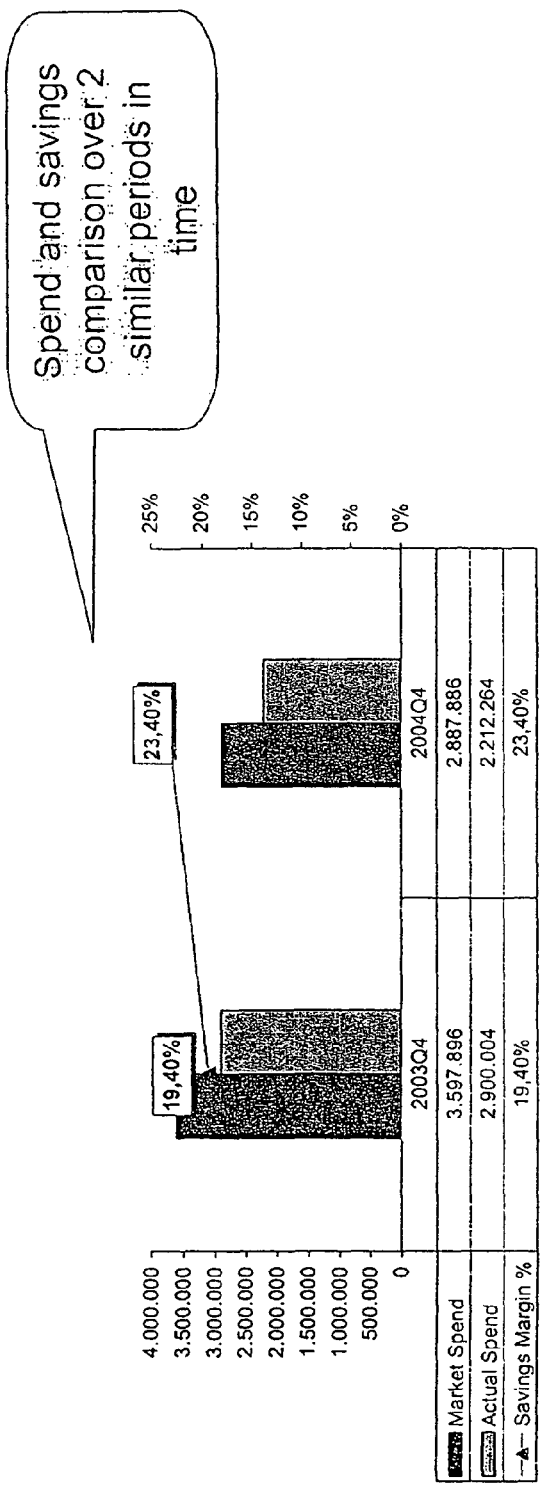
FIG. 5 shows a sample output showing results of analysis at a global level, including spending data and savings data for each of a first time period and a second time period, and data representing a change in savings from the first to the second time period.

The present invention is directed to a system, method and computer program product for comparing and analyzing expenditures and savings over different time periods. The present invention is now described in more detail herein in terms of the above exemplary description. This is for convenience only and is not intended to limit the application of the present invention. In fact, after reading the following description, it will be apparent to one skilled in the relevant arts how to implement the following invention in alternative embodiments.

The features and advantages of the present invention will become more apparent from the detailed description set forth below when taken in conjunction with the figures.

Although the invention may be applied to analyze spending and savings for any commodity (any good or service), one intended application of the invention is for travel-related services, such as air travel and hotel accommodation.

The invention is intended to be of particular utility to an organizational entity, e.g., a large corporation, in which it may be difficult to measure savings due to the large size of the entity and to the difficulties of gathering all of the relevant data and of analyzing that data in order to obtain guidance as to how to improve savings performance.

In what follows, an example of the invention as applied to air travel consumption and expenditures will be explained with reference to the figures.

I. Input
Content of Data

A "sector" as used herein refers to a (purchase of a) one-way air flight between two geographical points. As such, a particular sector can be specified by reference to an airport pair, or air route. No directional sequence is implied by a particular sector. For example, while a given sector may be named AMS-PHL, that sector refers to any one-way flight between Amsterdam and Philadelphia, in either direction. If a company purchases for its employees in the fourth quarter of calendar year 2003 (2003Q4) one hundred round trip air tickets, each ticket being for travel from Amsterdam to Philadelphia and back, the company will be said to have purchased 200 sectors for the route AMS-PHL during 2003Q4.

Assume the invention is being put to service for a given corporate client. Data representing corporate consumption of air travel for each of two time periods (say, 2003Q4 and 2004Q4) is to be collected. Of course, the time periods used need not be calendar year quarters but may be any desired time periods.

The data is to be analyzed and operated on to yield information on spending and savings pertaining to each of the two time periods, as well as information on the change in spending and savings between the two time periods, the factors driving that change, the respective magnitudes of those factors, and the reasons (from the standpoint of economics) underlying those factors.

For each sector purchased during 2003Q4 or 2004Q4, "sector information" is collected. The sector information may include values for some or all of the variables listed in Table 1 (FIG. 1), or some or all of a like set of variables. Some of this sector information is necessary for basic operations of the system (e.g., Quarter (time period of purchase), ASF (actual paid fare (average price)), PSF (published fare (average)), while other items of information permit a more thorough and detailed analysis but could optionally be omitted.

As shown in Table 1, for convenient characterization, certain variables are designated as key value indicators ("KVI") and other variables are designated as classification variables ("Class").

Of course, the invention may perform an analysis on air travel consumption without employing sectors as the basic unit of the commodity. For example, round trip air tickets, directional one-way air trips, etc. could be used as the basic unit of the commodity.

Data Feed/Importation

The data may be fed or imported into the system of the invention by use of any appropriate means and in any appropriate form and format (e.g., database, data mart), examples of which will be readily known by one of ordinary skill in the art. Prior to analysis, the data may also be cleaned, as necessary, by any appropriate methods known to one of ordinary skill in the art.

In one embodiment, some or all of the input data (sector information) for each sector purchased is collected at the time of purchase of the sector, using the transaction as the source of the data. For example, each time an employee of the company makes a purchase of the sector using a corporate American Express credit card, sector information (card data) is transferred electronically by a card feed process to an American Express travel database, whence it is transferred to another database specific to the given corporate client or otherwise designated as input data of the given corporate client.

It is noted that the invention may be implemented in a system designed to serve multiple clients simultaneously. While separate analyses are performed for each client, the use of a single system to serve multiple clients may facilitate comparative analyses comparing spending and savings of different clients.

If not all of the necessary or desired input data is obtainable from the American Express credit card transaction, the missing data may be obtained from other appropriate sources, such as the travel agency which brokered the purchase (such data may be referred to as "travel data"). Thus, it is possible for the input data for a given transaction (purchase of a sector) to be input into the system from a single source or from multiple sources.

The input data (sector information) may be enriched, not only for such purposes as explained above (where the card data is enriched by the travel data), but also, e.g., for the purpose of securing the data, facilitating manipulation of the data, or other purposes.

II. Process

Initially, examples of basic mathematical concepts employed by the invention are set forth below.

Spending may be defined as S*A*X, where the asterisks denote multiplication, and where $$\begin{cases} S = \text{number of sectors} = \sum S_i & \text{(defined only if there is spending)} \\ A = \text{avg price} = \dfrac{\sum S_i \cdot A_i}{\sum S_i} & \text{(defined only if there is spending)} \\ X = \text{exchange rate} & \text{(always defined)} \end{cases}$$

Then, the change in spending from time period 1 to time period 2 is:

$$\begin{aligned}\Delta_{Spending} &= \text{Spending}_2 - \text{Spending}_1 \\ &= S_2 \cdot A_2 \cdot X_2 - S_1 \cdot A_1 \cdot X_1 \\ &= S_2 \cdot A_2 \cdot X_2 - S_1 \cdot A_1 \cdot X_1 + S_2 \cdot A_2 \cdot X_1 - S_2 \cdot A_2 \cdot X_1 \\ &= (S_2 \cdot A_2 - S_1 \cdot A_1) \cdot X_1 + S_2 \cdot A_2 \cdot (X_2 - X_1) \\ &= (S_2 \cdot A_2 - S_1 \cdot A_1 + S_2 \cdot A_1 - S_2 \cdot A_1) \cdot \\ &\quad X_1 + S_2 \cdot A_2 \cdot (X_2 - X_1) \\ &= [S_2 \cdot (A_2 - A_1) + (S_2 - S_1) \cdot A_1] \cdot X_1 + S_2 \cdot A_2 \cdot (X_2 - X_1) \\ &= [S_2 \cdot \Delta A + \Delta S \cdot A_1] \cdot X_1 + S_2 \cdot A_2 \cdot \Delta X \\ &= S_2 \cdot \Delta A \cdot X_1 + \Delta S \cdot A_1 \cdot X_1 + S_2 \cdot A_2 \cdot \Delta X \\ &= S_2 \cdot \Delta A \cdot X_1 + \Delta S \cdot A_1 \cdot X_1 + S_2 \cdot A_2 \cdot \Delta X \\ &= \text{Price effect} + \text{Consumption effect} + \text{Exchng Rate effect} \end{aligned}$$

The total change in spending, $\Delta_{Spending}$, is the sum of component effects of the changes in spending.

The above is the generic case for standing routes (routes for which sectors were purchased in both period 1 and period 2).

The following limiting cases are to be noted.

For dead routes (routes for which sectors were purchased only in period 1):

$$\begin{cases} S_2 = 0 \\ A_2 = 0 \end{cases} \Rightarrow \Delta_{Spending} = -\text{Spending}_1 = -S_1 \cdot A_1 \cdot X_1$$

For new routes (routes for which sectors were purchased only in period 2):

$$\begin{cases} S_1 = 0 \\ A_1 = 0 \end{cases} \Rightarrow \Delta_{Spending} = \text{Spending}_2 = S_2 \cdot A_2 \cdot X_1 + S_2 \cdot A_2 \cdot \Delta X = S_2 \cdot A_2 \cdot X_2$$

Simple numerical examples are illustrated below. The first example employs a level of analysis of currency+airport pair+carrier:

| Currency | Airport Sequence | Carrier | Time 1 | | | Time 2 | | |
|---|---|---|---|---|---|---|---|---|
| | | | S1 | A1 | X1 | S2 | A2 | X2 |
| USD | LON-MIL | BA | 2 | 20 | 1 | 1 | 10 | 1 |
| USD | LON-MIL | AF | 3 | 10 | 1 | 5 | 10 | 1 |

Both "USD/LON-MIL/BA" and "USD/LON-MIL/AF" are standing routes:

"USD/LON-MIL/BA":

$$\begin{aligned}\Delta_{spending} &= \text{Price effect} + \text{Consumption effect} + \text{Exchng Rate effect} \\ &= S_2 \cdot \Delta A \cdot X_1 + \Delta S \cdot A_1 \cdot X_1 + S_2 \cdot A_2 \cdot \Delta X \\ &= 1 \cdot (10 - 20) \cdot 1 + (1 - 2) \cdot 20 \cdot 1 + 1 \cdot 10 \cdot (1 - 1) \\ &= -10 + -20 + 0 = -30 \end{aligned}$$

"USD/LON-MIL/AF":

$$\begin{aligned}\Delta_{spending} &= \text{Price effect} + \text{Consumption effect} + \text{Exchng Rate effect} \\ &= S_2 \cdot \Delta A \cdot X_1 + \Delta S \cdot A_1 \cdot X_1 + S_2 \cdot A_2 \cdot \Delta X \\ &= 5 \cdot (10 - 10) \cdot 1 + (5 - 3) \cdot 10 \cdot 1 + 5 \cdot 10 \cdot (1 - 1) \\ &= 0 + 20 + 0 = 20 \end{aligned}$$

Totals: "USD/LON-MIL"="USD/LON-MIL/BA"+"USD/LON-MIL/AF":

$$\begin{aligned}\Delta_{spending} &= (-10 + (-20) + 0)_{USD/LON-MIL/BA} + \\ &\quad (0 + 20 + 0)_{USD/LON-MIL/BA} \\ \Rightarrow \Delta_{spending} &= -10 + 0 + 0 = -10\end{aligned}$$

The second example employs the same data but at a different level of analysis, namely, currency+airport sequence:

| Currency | Airport Sequence | Carrier | S1 | A1 | X1 | S2 | A2 | X2 |
|---|---|---|---|---|---|---|---|---|
| USD | LON-MIL | | 5 | 14 | 1 | 6 | 10 | 1 |

"USD/LON-MIL":

$$\begin{aligned}\Delta_{spending} &= \text{Price effect} + \text{Consumption effect} + \text{Exchng Rate effect} \\ &= S_2 \cdot \Delta A \cdot X_1 + \Delta S \cdot A_1 \cdot X_1 + S_2 \cdot A_2 \cdot \Delta X \\ &= 6 \cdot (10 - 14) \cdot 1 + (6 - 5) \cdot 14 \cdot 1 + 6 \cdot 10 \cdot (1 - 1) \\ &= -24 + 14 + 0 = -10 \end{aligned}$$

Savings (also referred to as savings margin) may be defined, most basically, as:

market price−actual price.

Savings percentage (or savings margin percentage) may be defined as:

$$\frac{(\text{market price} - \text{actual price})}{\text{market price}}.$$

The change in savings from time period 1 to time period 2 (or the savings variance percentage) may be defined as:

savings percentage at time period 2–savings percentage at time period 1, or $$\frac{(\text{Market price2} - \text{actual price2})}{\text{Market price2}} - \frac{(\text{Market price1} - \text{actual price1})}{\text{Market price1}}$$

As was the case for spending, savings may also be understood as the sum of components. The savings variance percentage is seen to be the sum of the several effects on savings:

$$\text{Savings Variance \%} = \qquad(1)$$
$$\frac{\text{Dropped Spend Effect}}{MS_2} + \frac{\text{Consumption Effect}}{MS_2} +$$
$$\frac{\text{Price Effect}}{MS_2} + \frac{\text{Exchange Rate Effect}}{MS_2} + \frac{\text{New Spend Effect}}{MS_2}$$

where MS2=market price (market spending) at time period 2. A derivation of equation (1) is given in FIG. 4, starting from the definition of a component of savings (contribution of effect):

$$\text{Contribution of Effect} = \left(\frac{MS_2 - MS_1}{MS_1} - \frac{AS_2 - AS_1}{AS_1}\right) * AS_1 \qquad(2)$$

where MS2=market price (market spending) at time period 2, MS1=market price (market spending) at time period 1, AS2=actual price (actual spending) at time period 2, and AS1=actual price (actual spending) at time period 1. Based on equation (1), it is seen that the actual (e.g., dollar) amount of savings (e.g., for any given component, or for total savings) is:

Savings variance percentage*MS2.

It is understood that some of the formulations used herein to calculate various quantities and results may be varied, as will be appreciated by one of ordinary skill in the art. For example, the actual (e.g., dollar) amount of savings could be calculated substituting for MS2 another variable generally representing price or cost (e.g., AS1). That is, the actual (e.g., dollar) amount of savings could be calculated as:

Savings variance percentage*AS1.

In such case, the contribution of effect would be defined differently than equation (2). As another example, as illustrated in FIG. 12, the savings variance percentage may be calculated based on a different formula. Here, the savings variation percentage is equal to the difference between the percentage change in market price (market spending) over the two time periods and the percentage change in actual price paid (actual spending) over the two time periods (rather than equal to the percentage difference between the market price and actual price in period 2 minus the percentage difference between the market price and actual price in period 1). It is understood that at least certain of the real-world quantities modeled by the invention may legitimately be represented by any one of various mathematical formulations, such as will be appreciated by those of skill in the art.

Having set forth mathematical expressions representing the various components of spending and of savings, let us consider what those components mean intuitively. First of all, it must be borne in mind that these components represent effects on changes in spending or savings (as the case may be) over time. The components may be thought of as reflecting underlying economic factors that drive or determine spending or savings.

The price effect of spending reflects a change over time in the actual price paid for a commodity. The consumption effect of spending reflects a change over time in the amount (number of units purchased) of a commodity purchased. It is noted, however, that a commodity purchased can be conceived of to different degrees of specificity. For example, in the case of airplane trips or tickets as the commodity, a single item of the commodity may be conceived of as a flight from point O (origin) to point D (destination). Alternatively, a single item of the commodity may be conceived of as a flight from point O to point D on a given air carrier. Still alternatively, a single item of the commodity may be conceived of as a flight from point O to point D on a given air carrier at a given class of service. When a commodity is conceived of in a specific rather than general fashion, that is, as being identified or constituted by a combination of multiple variables (e.g., route, carrier and class), changes in amount of the commodity may alternately be conceived of as changes in type of the commodity. For example, if a company's total air travel purchases comprise 100 air tickets for flights between San Francisco and New York on United Airlines (100 units of commodity 1) in period 1 and 100 tickets for flights between San Francisco and New York on American Airlines in period 2 (100 units of commodity 2), we may say that the amounts of commodities 1 and 2 changed from period 1 to period 2 or, alternatively, we may say that the type of commodity changed from period 1 to period 2, that is, the commodity (namely, SF-NY flights) changed from United Airlines flights (type 1) to American Airlines flights (type 2). Another way of understanding this example is to say that this change in type may be reduced to (treated as) changes in amount. Indeed, it may be mathematically or computationally simpler to treat changes in type as changes in amount. Accordingly, the company's change from 100 UA tickets to 100 AA tickets from period 1 to period 2 may be treated as a change in amount of commodity 1 from 100 units purchased (in period 1) to 0 units purchased (in period 2) and a change in amount of commodity 2 from 0 units purchased (in period 1) to 100 units purchased (in period 2). In terms of the effects on spending, the change in amount of commodity 1 from 100 units purchased in period 1 to 0 units purchased in period 2 would be referred to as a dropped spending effect, and the change in amount of commodity 2 from 0 units purchased in period 1 to 100 units purchased in period 2 would be referred to as a new spending effect. Dropped spending effects and new spending effects are thus limiting cases of consumption effects.

The exchange rate effect of spending reflects a change, across the two periods of time, in the (e.g., average) exchange rate in effect at times of purchase of the commodity.

The corresponding components or effects of savings (price effect, consumption effect, dropped spending effect, new spending effect, exchange rate effect) may be conceived of intuitively in similar fashion. In regard to the price effect of savings, it is noted that when price paid for the commodity decreases over time (all other things being equal), savings increase, and vice versa, as reflected by the mathematical definition of savings given above. In regard to the consumption effect of savings, an increase in consumption (all other things being equal) will increase savings if for each (average) purchase the actual price is less than the market price, and will decrease savings if for each (average) purchase the actual price is more than the market price. Likewise, the new spending effect on savings will be positive (increase savings) if for each (average) purchase the actual price is less than the market price, and vice versa, while the dropped spending effect on savings will be the opposite.

Although not noted above in the mathematical presentation of savings components, it is also possible to determine a market price effect on savings. If the market price of the commodity increases from period 1 to period 2 (all other things being equal), then savings increase, as reflected by the mathematical definition of savings given above, since the actual price paid has become less relative to the market price.

Let us turn now to the specifics of the process of this example of the invention. After the data has been collected, the KVI variables are aggregated at the desired level of analysis, by grouping and summing the data of each kind. The sectors are divided into three groups (air sector groups): new routes (routes for which sectors were purchased in period 2 but not in period 1), standing routes (routes for which sectors were purchased in both period 1 and period 2; also referred to as active routes or old routes), and dead routes (routes for which sectors were purchased in period 1 but not in period 2; also referred to as dropped routes or extinct routes), as shown in Table. 2 (FIG. 1). So-called basic variance indicators (air sector variance indicators), including spending and savings at each time period and the changes in spending and in savings over the two periods, are calculated for each of the three air sector groups, as indicated in Table 3 (FIG. 1). The different components of spending are calculated, using the original currency (excluding the exchange rate effect), as shown in Table 4 FIG. 2), and using U.S. dollars, as shown in Table 5 (FIG. 2). The different components of savings are calculated, as shown in Table 6 (FIG. 3).

In regard to the formulations shown in Tables 3-6, it is noted that, as discussed above, for at least some of them, variants may be employed.

The results shown in Tables 3-6 may be calculated at any desired level of analysis and then aggregated to yield higher level results, including global results. For example, the results may be calculated for each airport pair. Thus, spending in period 1, spending in period 2, savings in period 1, and savings in period 2 would be calculated for each airport pair. For example, for any given airport pair, the product of Sectors1 (the number of sectors of that airport pair purchased in period 1) and ASF1 (the actual price paid (average price) for each of those sectors) is calculated as the spending in period 1 (Spend1) for that airport pair (see Table 3). (Alternatively, taking into account the exchange rate effect, the spending in period 1 is calculated as the product of Sectors1 and ASF1 and ExcRate1 (average exchange rate (weighted with price) at time 1) (see Tables 5 and 3).) Total (i.e., for all airport pairs) spending in period 1, total spending in period 2, total savings in period 1, and total savings in period 2 may be obtained by aggregating the results for each airport pair.

The components of spending and the components of savings would also be calculated for each airport pair. As was the case for spending and savings, so too the components of spending and the components of savings calculated for each airport pair may be aggregated to yield components of total spending and components of total savings.

Thus, according to the invention, the results at higher levels are calculated by aggregating results obtained at the base levels (using whatever levels are desired as base levels). The analysis does not need to be repeated at the higher levels. Simple examples of the aggregative nature of the process of the invention were illustrated in the above discussion of the basic mathematical representations of spending and savings.

As an alternative example to using airport pair as the initial level of analysis, air carrier could be employed. In this case, the initial level of analysis compares purchases of tickets on different carriers, rather than purchases of tickets for different air routes. In this case, spending and savings in each time period, components of spending and savings, and the totals would be calculated for each air carrier (instead of for each air route). For example, for any given carrier, spending in period 1 would be calculated as the product of the number of tickets of that carrier purchased in period 1 (this variable is not shown in the figures) and ASF1 (the actual price paid (average price) for each of those tickets.

As another alternative example, class of service could be employed as the initial level of analysis. In this case, the initial level of analysis compares purchases of tickets of different classes of service, rather than purchases of tickets for different air routes. In this case, for example, for any given class of service, spending in period 1 would be calculated as the product of the number of tickets of that class of service purchased in period 1 (this variable is not shown in the figures) and ASF1 (the actual price paid (average price) for each of those tickets.

Regardless of the initial level of analysis, the system is designed to perform further lower level analyses in a drill down fashion. For example, in addition to overall results for a given airport pair, subresults may be obtained for each carrier for that airport pair. Then, in addition to overall results for a given airport pair and a given carrier, subresults may be obtained for each class of service for that airport pair and that carrier. Of course, global results, i.e., results covering all of the company's air trip purchases in total, will generally be desired. Thus, results may be calculated for any level(s) of analysis, including nested (drill down) levels.

Of course, it is also possible for the initial level of analysis to encompass multiple variables in terms of which the commodity is defined. For example, the initial level of analysis itself could be the combination of airport pair+air carrier+class of service. In that case, the initial level of analysis compares purchases of different combinations of airport pair+air carrier+class of service. In that case, for any given combination of airport pair+air carrier+class of service, spending in period 1 would be calculated as the product of Sectors1 (the number of sectors of that combination of airport pair+air carrier+class of service purchased in period 1) and ASF1 (the actual price paid (average price) for each of those sectors).

It will be understood that still other alternative examples of initial levels of analysis may be employed (e.g., other permutations of the variables already discussed (airport pair, air carrier, class of service), or including yet other variables such as purchase type (e.g., advance purchase vs. non-advance purchase), flight time (e.g., weekend vs. weekday), etc. The different levels of analysis, including drill down analyses, will become clearer upon illustration in the discussion of output, below.

Of course, in any alternative example, such as those discussed above, the exchange rate effect may be taken into account, as noted above.

Based on the results obtained by the invention, recommendations for changing behavior to improve spending and savings performance may be made. Identification of the different components of spending and savings, and their relative magnitudes, as well as the different subcomponents, in terms of commodities (identifying the relative effects of different commodities, e.g., different combinations of air route+air carrier+class of service), informs an organization where to focus its attempt to reduce spending and increase savings. The nature of the recommendations will become clearer upon illustration in the discussion of output, below.

In addition to analyzing spending and savings for a given organization, the invention is also designed to compare performance of the given organization with other peer organizations, as will be seen in the discussion of output, below.

Finally, independent economic analysis of the market for the commodity may be performed. The results of this economic analysis may be used to provide explanations, in terms of economics, of reasons for the company's spending and savings performance. For example, positive or negative performance by the company may be explainable by reference to factors or supply and demand.

The recommendations for changing behavior to improve performance may be supplemented by the comparative peer analysis (as discussed in the output section, below) and by the economic analysis. For example, if supply exceeds demand, prospects for negotiating a better price with sellers (e.g., airlines) may be favorable. In this situation, focusing on the price effect (attempting to reduce the actual price paid) may be a relatively successful strategy to improve performance.

The operation of the invention as set forth above will become clearer upon explanation of the output of the invention, below.

III. Output

As output, the invention may provide reports presenting the results of analysis in user-friendly formats, including graphical and tabular formats. In what follows, an example of the output will be presented with reference to FIGS. 5-11.

The output may conveniently begin at a top (global) level and proceed to successively lower levels of analysis, as driven by the factors and elements of consumption that have the greatest effect on spending and savings.

FIG. 5 gives as an overview a picture of a company's overall spending and savings, and their change over time, for air travel purchased in two different time periods. For each time period (2003Q4 and 2004Q4), total actual spending is shown as Actual Spend ($2,900,004 and $2,212,264, respectively), and what total spending would have been if the purchases had been made at the market price (e.g., published fare) is shown as Market Spend ($3,597,896 and $2,887,886, respectively). And for each time period, the savings, which is defined as the difference between the market price and the actual price paid, is shown in percentage terms as Savings Margin % (19.40% and 23.40%, respectively). The change in savings over the two time periods, i.e., the difference between the savings of 2004Q4 and the savings of 2003Q4, is given as the savings variance (4.00%). A dollar amount corresponding to the savings variance, equal to Savings Margin %*MS2 (i.e., market spending at time period 2), as explained above, is also given ($115,454).

Figure 6:
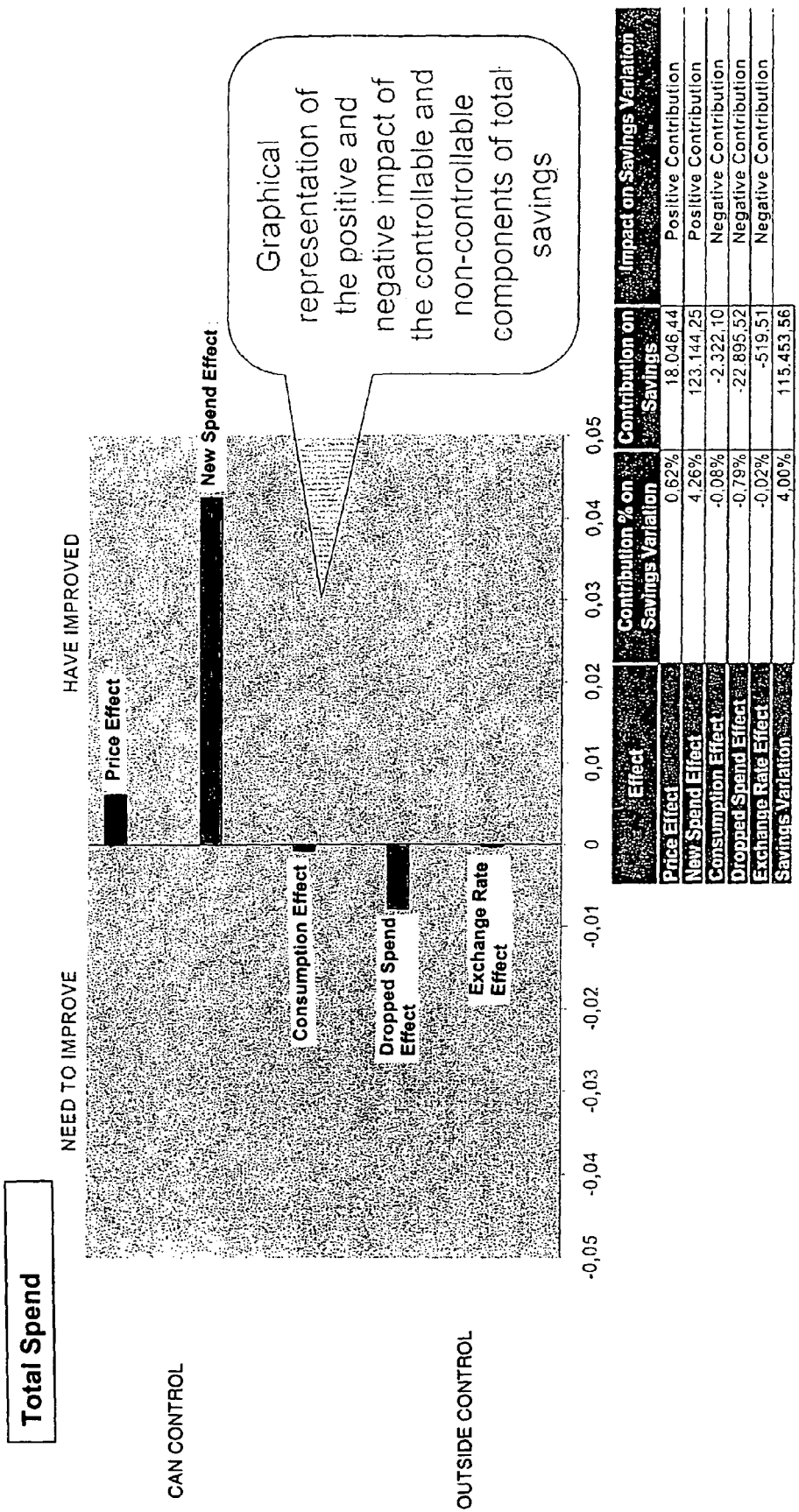
FIG. 6 shows a sample output showing results of analysis at a global level, including data representing components of the change in savings shown in FIG. 5.

Turning to FIG. 6, we see a graphical representation of the components of the change in savings over the two time periods. The bar graph shows the magnitude of each component of the change in savings, in percentage terms. Positive values ("Have Improved") correspond to positive effects on savings (factors that have increased savings over the two time periods), and negative values ("Need to Improve") correspond to negative effects on savings (factors that have decreased savings over the two time periods). Thus, the price effect and new spending effect have positive values of 0.62% and 4.26%, respectively. The consumption effect, dropped spending effect and exchange rate effect have negative values of −0.08%, −0.79% and −0.02%, respectively.

The different components of the change in savings, or effects, are arranged vertically in the bar graph according to whether they are subject to or outside of the control of the company, that is, whether or not the company has the ability to change the effects. Thus, the exchange rate, which is set by governmental entities, cannot be affected by any action on the part of the company. However, the company is in control of its own purchase decisions, so the consumption effect, new spending effect and dropped spending effect are all within the company's control. It is noted that the new spending effect and the dropped spending effect are, in a generic sense, consumption effects (changes in the amount of a commodity purchased), as they represent limiting cases of the consumption effect, as explained above, in which purchases are zero for one of the two time periods and above zero for the other of the two time periods. In addition, the price effect is deemed to be within the control of the company, as the company may affect the actual price paid, e.g., by negotiating with sellers.

It is further noted that, as discussed above, the values of the several effects on savings sum up to the total savings variation (savings variance), as seen in the table below the bar graph in both percentage and dollar terms.

Turning to FIG. 7, a ranking of the different air routes, according to the amount (percentage) of actual spending they account for, is provided. For convenience, only a small portion of the table of ranked routes (i.e., a portion covering only the top 13 routes from among all the routes for which sectors were purchased) is illustrated herein. A geographical focus has now been identified for more detailed analysis, that is, analysis at a lower level of analysis, as driven by the elements of consumption that have the greatest effect on spending.

At this stage, the type of results shown in FIGS. 5 and 6, showing spending, savings, their change, and the components of the change in savings, may be again provided, but this time covering only a portion of the routes, that is, a portion which accounts for a significant percentage of total spending on air travel, e.g., the routes comprising 80% of total spending on air travel. (These results are not shown.)

Turning to FIG. 8, results of analysis are provided for individual top routes, i.e., individual routes accounting for the largest percentage of spending. For example, as shown in FIG. 7, AMS-PHL was ranked fifth. FIG. 8 shows the same type of results as shown in FIGS. 5 and 6, but covering only the route AMS-PHL. In this case, the new spending effect is seen to be the prime contributor to the change in savings over the two time periods. The results such as shown in FIG. 8 may be output for any number of individual routes as desired.

Figure 9:
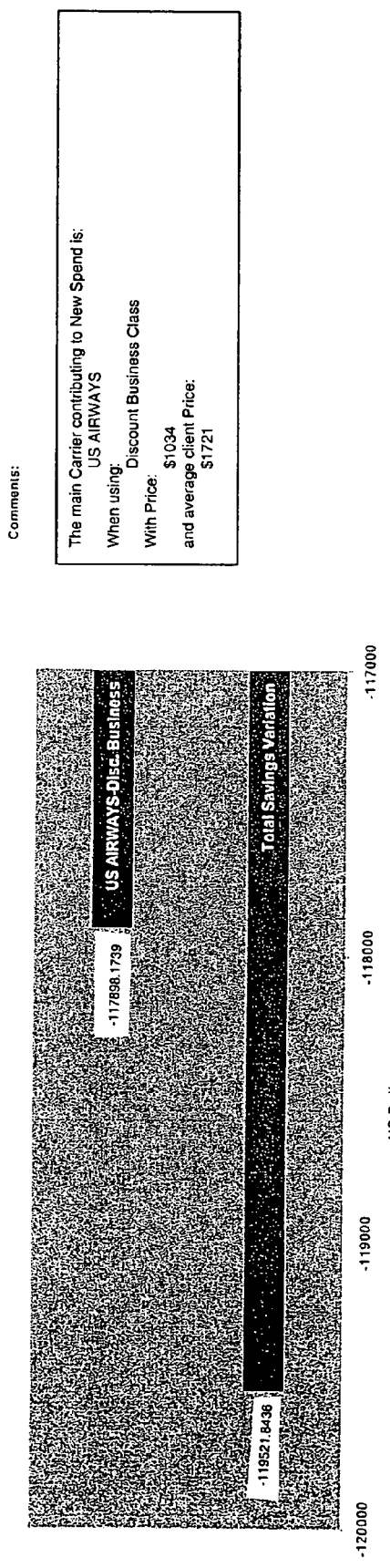
FIG. 9 shows a sample output showing results at a level of analysis below that of FIG. 8. Specifically.

Moving beyond the level of individual routes to a still lower level of analysis, results of analysis may be presented for, e.g., the different carriers used for a given individual route, the different classes of service used on a given individual route, or the different combinations of air carrier+class of service used for a given individual route. Thus, FIG. 9 shows which combination of carrier+class was most responsible for the new spending effect, which was seen in FIG. 8 as being the prime contributor to the change in savings for this route. Although only a single combination of carrier+class (the single most significant one) is shown in FIG. 9, of course, multiple combinations could be shown, e.g., the several most significant combinations.

In FIG. 9, then, we drilled down to a lower level of analysis, in order to determine which components at the next level down have the greatest effect on savings. Drilling down may continue further. The results of analysis may be presented for still lower levels of analysis. For example, for a given combination of carrier+class, results (not shown) could be presented showing the relative magnitudes of the effects (on the change in savings) of different ticket types (e.g., advance purchase vs. non-advance purchase) or of different times of travel (e.g., weekend vs. weekday), and so on.

It is noted that while the components of the change in savings shown in FIGS. 6 and 8 (price effect, consumption effect, etc.) represent different purchasing factors, as it were, pertaining to global consumption (FIG. 6) or to consumption of a commodity broadly defined (here, consumption of a given air route) (FIG. 8), the (sub)components shown in FIG. 9 represent different commodities (defined more narrowly). The commodity subcomponents of FIG. 9 are responsible for the single greatest purchasing factor component of FIG. 8. Of course, each purchasing factor component at the level of FIG. 8 (individual air route) could be broken down into commodity subcomponents of the level of FIG. 9.

Based on the results shown in FIGS. 5-9, recommendations for changes in consumption behavior can be made, according to the key purchasing factor components and key commodity subcomponents. "Key" is used to mean most or significantly contributory to the change in savings. The company can focus its action on the key factors to try to improve performance. For example, it may shift purchasing to a different airline or class of service for any given route in order to increase savings.

Figure 10:
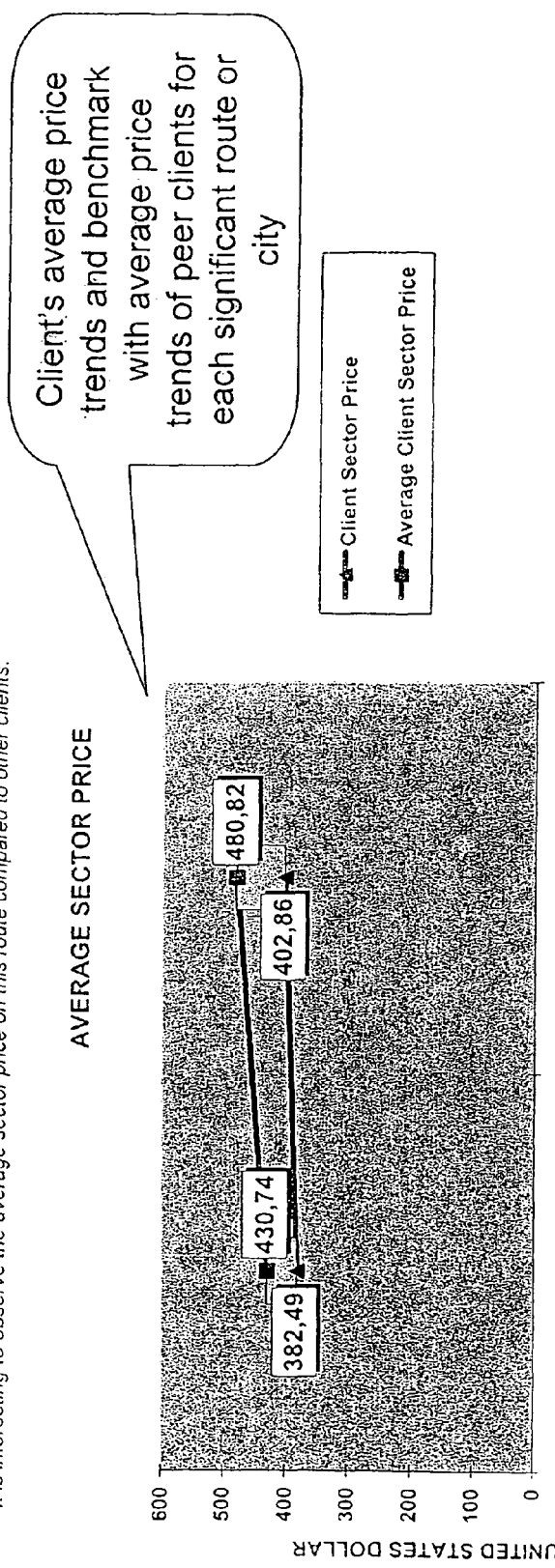
FIG. 10 shows a sample output showing, at a global level, the average actual price paid for a sector by a client, and the average actual price paid for a sector by the client's peer group, for each of the two time periods.

In addition to the above results, which evaluate performance of an individual organization, comparative results comparing the performance of an organization to that of its peers may be presented. Thus, FIG. 10 shows the actual (average) price paid per sector for a given organization ("client sector price") and for all organizations in the client's peer group ("average client sector price"), for each of the two time periods, and the pertinent changes over time and differences between client and peer group. While FIG. 10 shows global results (the average price paid per sector, over all sectors purchased), the same type of results may be presented comparing client sector price with average client sector price for a given individual route, or combination of route+carrier+ class, or the like. In addition, results may be presented comparing client and peer group with respect to the market price that applies to them, rather than the actual price paid.

Such comparative results comparing performance of client with peer group are useful since performance in these areas should be evaluated not only in absolute terms but also relative to competitors. For example, performance that is relatively poor (decreased over time) may not seem as problematic if it is common to all in the peer group (e.g., all in the same industry). Such results could reflect more on economic conditions than on the client.

In that vein, turning to FIG. 11, we see the results of an independent economic analysis, in terms of supply and demand, of the market for a given air route. In the example of FIG. 11, supply increased and demand decreased. In such a case, if client performance is weak for the given sector, or weak compared to peers, then the results of the economic analysis suggest that price effect may be a productive focus of the client's efforts to improve performance. By pursuing negotiation with sellers, the client may be able to reduce the actual price it pays, and in this way improve savings. Thus, the results of the economic analysis and the results of the comparative client-peer analysis may serve to put an individual client's performance in proper perspective, and may be used as a basis for refining recommendations for action implicated by the results of the analysis of spending and savings.

IV. Example Implementations

The present invention, or any part(s) or function(s) thereof, may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 13:
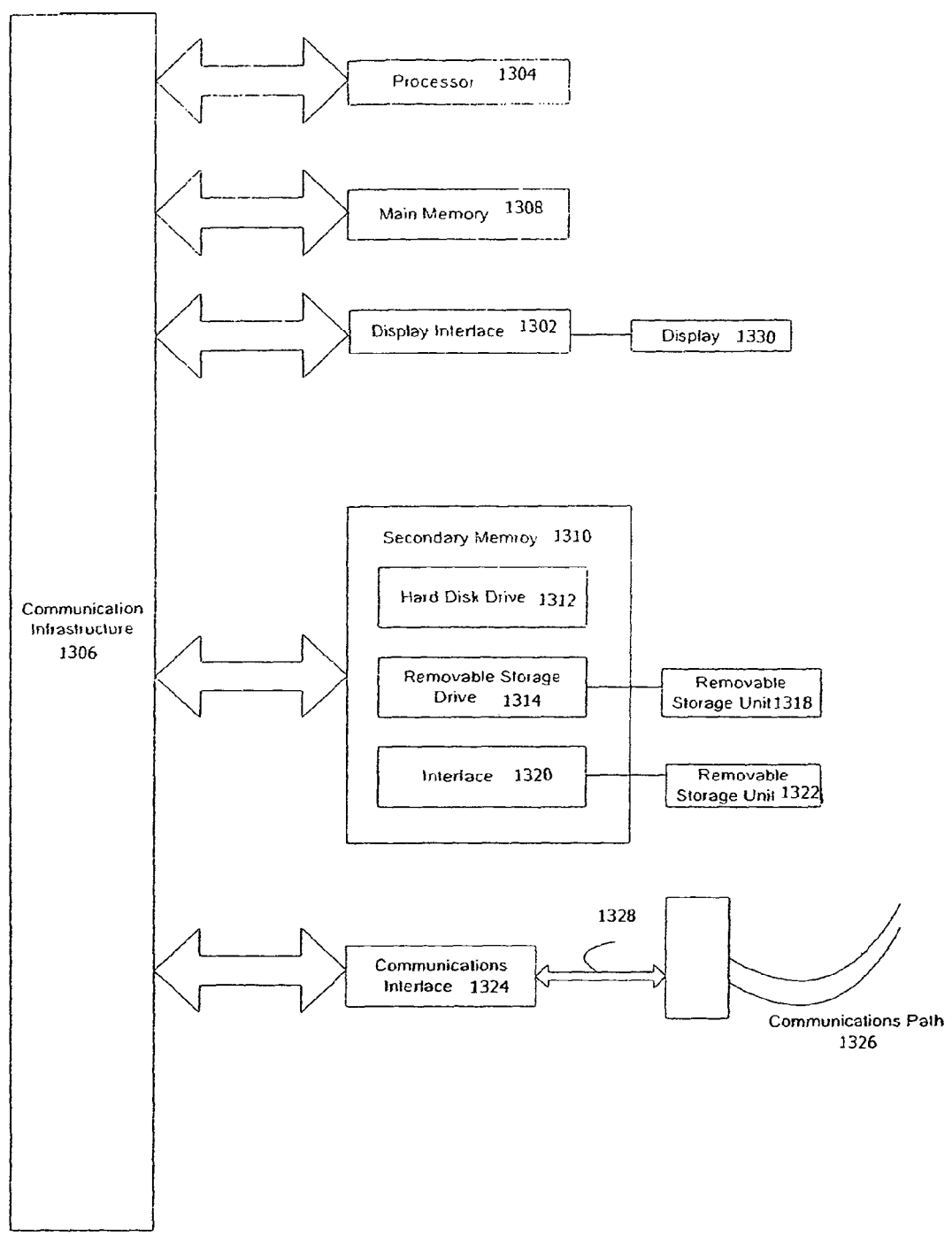
FIG. 13 is a block diagram of an exemplary computer system useful for implementing the present invention.

In fact, in one embodiment, the invention is directed toward one or more computer systems capable of carrying out the functionality described herein. An example of a computer system 1300 is shown in FIG. 13.

The computer system 1300 includes one or more processors, such as processor 1304. The processor 1304 is connected to a communication infrastructure 1306 (e.g., a communications bus, cross-over bar, or network). Various software embodiments are described in terms of this exemplary computer system. After reading this description, it will become apparent to a person skilled in the relevant arts how to implement the invention using other computer systems and/or architectures.

Computer system 1300 can include a display interface 1302 that forwards graphics, text, and other data from the communication infrastructure 1306 (or from a frame buffer not shown) for display on the display unit 1330.

Computer system 1300 also includes a main memory 1308, preferably random access memory (RAM), and may also include a secondary memory 1310. The secondary memory 1310 may include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well known manner. Removable storage unit 1318 represents a floppy disk, magnetic tape, optical disk, etc. which is read by and written to by removable storage drive 1314. As will be appreciated, the removable storage unit 1318 includes a computer usable storage medium having stored therein computer software and/or data.

In alternative embodiments, secondary memory 1310 may include other similar devices for allowing computer programs or other instructions to be loaded into computer system 1300. Such devices may include, for example, a removable storage unit 1322 and an interface 1320. Examples of such may include a program cartridge and cartridge interface (such as that found in video game devices), a removable memory chip (such as an erasable programmable read only memory (EPROM), or programmable read only memory (PROM)) and associated socket, and other removable storage units 1322 and interfaces 1320, which allow software and data to be transferred from the removable storage unit 1322 to computer system 1300.

Computer system 1300 may also include a communications interface 1324. Communications interface 1324 allows software and data to be transferred between computer system 1300 and external devices. Examples of communications interface 1324 may include a modem, a network interface (such as an Ethernet card), a communications port, a Personal Computer Memory Card International Association (PCMCIA) slot and card, etc. Software and data transferred via communications interface 1324 are in the form of signals 1328 which may be electronic, electromagnetic, optical or other signals capable of being received by communications interface 1324. These signals 1328 are provided to communications interface 1324 via a communications path (e.g., channel) 1326. This channel 1326 carries signals 1328 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1314, a hard disk installed in hard disk drive 1312, and signals 1328. These computer program products provide software to computer system 1300. The invention is directed to such computer program products.

Computer programs (also referred to as computer control logic) are stored in main memory 1308 and/or secondary memory 1310. Computer programs may also be received via communications interface 1324. Such computer programs, when executed, enable the computer system 1300 to perform the features of the present invention, as discussed herein. In particular, the computer programs, when executed, enable the processor 1304 to perform the features of the present invention. Accordingly, such computer programs represent controllers of the computer system 1300.

In an embodiment where the invention is implemented using software, the software may be stored in a computer program product and loaded into computer system 1300 using removable storage drive 1314, hard drive 1312 or communications interface 1324. The control logic (software), when executed by the processor 1304, causes the processor 1304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant arts.

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant arts that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures appended hereto, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method for comparing and analyzing expenditures and savings for a first and a second time period, comprising:
   receiving, by a computer based system for comparing and analyzing expenditures and savings comprising a processor and a memory, and from an input device, consumption data, expenditure data and market price data for the first and the second time periods relating to the purchase of a commodity;
   calculating, by the computer based system, a first savings based on differences between the market price data and the expenditure data for the first time period;
   calculating, by the computer based system, a second savings based on differences between the market price data and the expenditure data for the second time period;
   calculating, by the computer based system, a change in savings based on differences between the first savings and the second savings;
   calculating, by the computer based system, a market price effect based upon a change in a market price of the commodity purchased between the first time period and the second time period;
   calculating, by the computer based system, a consumption effect based upon a change in the amount of the commodity purchased between the first time period and the second time period;
   calculating, by the computer based system, an expenditure effect based upon a change in an actual price paid for the commodity purchased between the first time period and the second time period;
   calculating, by the computer based system, an exchange rate effect based upon a change in a currency exchange rate between the first time period and the second time period;
   outputting, by the computer based system, to a display device a value of the market price effect, the consumption effect, the expenditure effect, the exchange rate effect, and at least one of the first savings, the second savings and the change in savings;
   identifying, by the computer based system, a component of the change in savings that is subject to control of an organization,
   outputting, by the computer based system, to the display device, the component of the change in savings that is subject to control of the organization,
   wherein the consumption data represents a type and an amount of the commodity consumed by the organization during a given time period, the expenditure data represents an actual cost paid for the commodity by the organization during that given time period, and the market price data represents the market price of the commodity during that given time period.

2. The method according to claim 1,
   wherein the receiving step also includes receiving exchange rate data for the first and the second time periods,
   wherein the change in savings also is based on differences between the exchange rate data for the first time period and the exchange rate data for the second time period, and wherein the exchange rate data represents an exchange rate in effect at the time of purchase of the commodity during a given time period.

3. The method according to claim 1, further comprising:
wherein the consumption effect is a quantified effect on the change in savings of a change in consumption of the commodity from the first time period to the second time period, the new spending effect is a quantified effect on the change in savings of a commencement of consumption of the commodity occurring after the first time period and before or during the second time period, the dropped spending effect is a quantified effect on the change in savings of a cessation of consumption of the commodity occurring during or after the first time period and before the second time period, the expenditure effect is a quantified effect on the change in savings of a change in the actual cost paid for the commodity from the first time period to the second time period, and the market price effect is a quantified effect on the change in savings of a change in the market price of the commodity from the first time period to the second time period.

4. The method according to claim 2, further comprising:
wherein the consumption effect is a quantified effect on the change in savings of a change in consumption of the commodity from the first time period to the second time period, the new spending effect is a quantified effect on the change in of a commencement of consumption of the commodity occurring after the first time period and before or during the second time period, the dropped spending effect is a quantified effect on the change in savings of a cessation of consumption of the commodity occurring during or after the first time period and before the second time period, the expenditure effect is a quantified effect on the change in savings of a change in the actual cost paid for the commodity from the first time period to the second time period, the market price effect is a quantified effect on the change in savings of a change in the market price of the commodity from the first time period to the second time period, and the exchange rate effect is a quantified effect on the change in savings of a change, from the first time period to the second time period, in the exchange rate in effect at the time of purchase of the commodity.

5. The method according to claim 1,
wherein the change in savings is calculated at different levels of analysis including a first level of analysis L1 at which the commodity is defined in terms of N1 variables and one or more additional levels of analysis L2, . . . , Ln at which the commodity is defined in terms of N2, . . . , Nn variables, respectively, where N1 is an integer equal to or greater than 0, and for each successive level L2, . . . , Ln the number of variables N2, . . . , Nn in terms of which the commodity is defined is at least one more than the number of variables in terms of which the commodity is defined at the previous level.

6. The method according to claim 5,
wherein the change in savings calculated at the first level of analysis includes different first level components of the change in savings,
wherein the change in savings calculated at a second level of analysis includes one or more different second level components of the change in savings, and
wherein the one or more second level components represent one or more different commodities, respectively, responsible for the change in savings represented by a given first level component, each of the one or more different commodities being defined in terms of one or more variables.

7. A system for comparing and analyzing expenditures and savings for a first and a second time period, comprising:
a data reception device, arranged to receive consumption data, expenditure data and market price data for the first and the second time periods;
a calculation device, arranged to calculate a first savings based on differences between the market price data and the expenditure data for the first time period, a second savings based on differences between the market price data and the expenditure data for the second time period, a market price effect based upon a change in a market price of the commodity purchased between the first time period and the second time period, a consumption effect based upon a change in the amount of the commodity purchased between the first time period and the second time period, an expenditure effect based upon a change in an actual price paid for the commodity purchased between the first time period and the second time period, an exchange rate effect based upon a change in a currency exchange rate between the first time period and the second time period, and a change in savings based on differences between the first savings and the second savings; and
an output device, arranged to output a value of the market price effect, the consumption effect, the expenditure effect, the exchange rate effect, and at least one of the first savings, the second savings, and the change in savings, and a component of the change in savings that is subject to control of an organization
wherein the consumption data represents a type and an amount of the commodity consumed by the organization during a given time period, the expenditure data represents an actual cost paid for the commodity by the organization during that given time period, and the market price data represents the market price of the commodity during that given time period.

8. The system according to claim 7,
wherein the data reception device is arranged also to receive exchange rate data for the first and the second time periods,
wherein the calculation device is further arranged to calculate the change in savings based on differences between the exchange rate data for the first time period and the exchange rate data for the second time period, and
wherein the exchange rate data represents an exchange rate in effect at the time of purchase of the commodity during a given time period.

9. The system according to claim 7,
wherein the consumption effect is a quantified effect on the change in savings of a change in consumption of the commodity from the first time period to the second time period, the new spending effect is a quantified effect on the change in savings of a commencement of consumption of the commodity occurring after the first time period and before or during the second time period, the dropped spending effect is a quantified effect on the change in savings of a cessation of consumption of the commodity occurring during or after the first time period and before the second time period, the expenditure effect is a quantified effect on the change in savings of a change in the actual cost paid for the commodity from the first time period to the second time period, and the market price effect is a quantified effect on the change in savings of a change in the market price of the commodity from the first time period to the second time period.

10. The system according to claim 8,
wherein the consumption effect is a quantified effect on the change in savings of a change in consumption of the commodity from the first time period to the second time period, the new spending effect is a quantified effect on the change in savings of a commencement of consumption of the commodity occurring after the first time period and before or during the second time period, the dropped spending effect is a quantified effect on the change in savings of a cessation of consumption of the commodity occurring during or after the first time period and before the second time period, the expenditure effect is a quantified effect on the change in savings of a change in the actual cost paid for the commodity from the first time period to the second time period, the market price effect is a quantified effect on the change in savings of a change in the market price of the commodity from the first time period to the second time period, and the exchange rate effect is a quantified effect on the change in savings of a change, from the first time period to the second time period, in the exchange rate in effect at the time of purchase of the commodity.

11. The system according to claim 7,
wherein the change in savings is calculated at different levels of analysis including a first level of analysis L1 at which the commodity is defined in terms of N1 variables and one or more additional levels of analysis L2, . . . , Ln at which the commodity is defined in terms of N2, . . . , Nn variables, respectively, where N1 is an integer equal to or greater than 0, and for each successive level L2, . . . , Ln the number of variables N2, . . . , Nn in terms of which the commodity is defined is at least one more than the number of variables in terms of which the commodity is defined at the previous level.

12. The system according to claim 11,
wherein the change in savings calculated at the first level of analysis includes different first level components of the change in savings, and
wherein the change in savings calculated at a second level of analysis includes one or more different second level components of the change in savings, wherein the one or more second level components represent one or more different commodities, respectively, responsible for the change in savings represented by a given first level component, each of the one or more different commodities being defined in terms of one or more variables.

13. An article of manufacture including a computer readable medium having non-transitory instructions stored thereon that, in response to execution by a computing device comprising a processor and a tangible, non-transitory memory, cause the computing device to perform operations comprising:
receiving consumption data, expenditure data and market price data for the first and the second time periods;
calculating a first savings based on differences between the market price data and the expenditure data for the first time period;
calculating a second savings based on differences between the market price data and the expenditure data for the second time period;
calculating a change in savings based on differences between the first savings and the second savings;
calculating a market price effect based upon a change in a market price of the commodity purchased between the first time period and the second time period;
calculating a consumption effect based upon a change in the amount of the commodity purchased between the first time period and the second time period;
calculating an expenditure effect based upon a change in an actual price paid for the commodity purchased between the first time period and the second time period;
calculating an exchange rate effect based upon a change in a currency exchange rate between the first time period and the second time period;
outputting a value of the market price effect, the consumption effect, the expenditure effect, the exchange rate effect and at least one of the first savings, the second savings, and the change in savings,
identifying a component of the change in savings that is subject to control of an organization,
outputting to the display device, the component of the change in savings that is subject to control of the organization, and
wherein the consumption data represents a type and an amount of the commodity consumed by the organization during a given time period, the expenditure data represents an actual cost paid for the commodity by the organization during that given time period, and the market price data represents the market price of the commodity during that given time period.

14. The article according to claim 13, wherein the receiving further comprises receiving exchange rate data for the first and the second time periods,
wherein the change in savings also is based on differences between the exchange rate data for the first time period and the exchange rate data for the second time period, and
wherein the exchange rate data represents an exchange rate in effect at the time of purchase of the commodity during a given time period.

15. The article according to claim 13,
the consumption effect is a quantified effect on the change in savings of a change in consumption of the commodity from the first time period to the second time period, the new spending effect is a quantified effect on the change in savings of a commencement of consumption of the commodity occurring after the first time period and before or during the second time period, the dropped spending effect is a quantified effect on the change in savings of a cessation of consumption of the commodity occurring during or after the first time period and before the second time period, the expenditure effect is a quantified effect on the change in savings of a change in the actual cost paid for the commodity from the first time period to the second time period, and the market price effect is a quantified effect on the change in savings of a change in the market price of the commodity from the first time period to the second time period.

16. The article according to claim 14,
wherein the consumption effect is a quantified effect on the change in savings of a change in consumption of the commodity from the first time period to the second time period, the new spending effect is a quantified effect on the change in savings of a commencement of consumption of the commodity occurring after the first time period and before or during the second time period, the dropped spending effect is a quantified effect on the change in savings of a cessation of consumption of the commodity occurring during or after the first time period and before the second time period, the expenditure effect is a quantified effect on the change in savings of a change in the actual cost paid for the commodity from the first time period to the second time period, the market price effect is a quantified effect on the change in savings of a change in the market price of the commodity from the first time period to the second time period, and the exchange rate effect is a quantified effect on the change in savings of a change, from the first time period to the second time period, in the exchange rate in effect at the time of purchase of the commodity.

17. The article according to claim 13,
wherein the change in savings is calculated at different levels of analysis including a first level of analysis L1 at which the commodity is defined in terms of N1 variables and one or more additional levels of analysis L2, . . . , Ln at which the commodity is defined in terms of N2, . . . , Nn variables, respectively, where N1 is an integer equal to or greater than 0, and for each successive level L2, . . . , Ln the number of variables N2, . . . , Nn in terms of which the commodity is defined is at least one more than the number of variables in terms of which the commodity is defined at the previous level.

18. The article according to claim 17,
wherein the change in savings calculated at the first level of analysis includes different first level components of the change in savings, and
wherein the change in savings calculated at a second level of analysis includes one or more different second level components of the change in savings, wherein the one or more second level components represent one or more different commodities, respectively, responsible for the change in savings represented by a given first level component, each of the one or more different commodities being defined in terms of one or more variables.

* * * * *